United States Patent
Wu et al.

(10) Patent No.: US 10,845,660 B2
(45) Date of Patent: Nov. 24, 2020

(54) DISPLAY PANEL AND DISPLAY DEVICE

(71) Applicant: XIAMEN TIANMA MICRO-ELECTRONICS CO., LTD, Xiamen (CN)

(72) Inventors: Huangyao Wu, Xiamen (CN); Wei Wu, Xiamen (CN); Xiufeng Zhou, Xiamen (CN); Poping Shen, Xiamen (CN)

(73) Assignee: XIAMEN TIANMA MICRO-ELECTRONICS CO., LTD., Xiamen (CN)

(*) Notice: Subject to any disclaimer, the term of this patent is extended or adjusted under 35 U.S.C. 154(b) by 0 days.

(21) Appl. No.: 16/236,203

(22) Filed: Dec. 28, 2018

(65) Prior Publication Data
US 2019/0235334 A1 Aug. 1, 2019

(30) Foreign Application Priority Data
Jan. 30, 2018 (CN) .......................... 2018 1 0090004

(51) Int. Cl.
*G02F 1/1362* (2006.01)
*G09G 3/20* (2006.01)

(52) U.S. Cl.
CPC ......... *G02F 1/136286* (2013.01); *G09G 3/20* (2013.01); *G02F 2201/56* (2013.01)

(58) Field of Classification Search
CPC . G02F 1/136286; G02F 2201/56; G09G 3/20; G09G 2300/0426; G09G 2310/0232; G09G 3/2092; G09F 9/00
See application file for complete search history.

(56) References Cited

U.S. PATENT DOCUMENTS

| | | | |
|---|---|---|---|
| 2012/0112988 A1 | 5/2012 | Nakanishi et al. | |
| 2015/0309377 A1* | 10/2015 | Choi | G02F 1/133514 349/43 |
| 2017/0309644 A1* | 10/2017 | Yeh | G02F 1/1362 |
| 2018/0129111 A1 | 5/2018 | Wu et al. | |
| 2018/0166018 A1 | 6/2018 | Yang | |

(Continued)

FOREIGN PATENT DOCUMENTS

| | | |
|---|---|---|
| CN | 105788462 A | 7/2016 |
| CN | 107342036 A | 11/2017 |

(Continued)

OTHER PUBLICATIONS

First CN Office Action, dated Sep. 23, 2019 and English Translation.

*Primary Examiner* — Mark W Regn
(74) *Attorney, Agent, or Firm* — Alston & Bird LLP

(57) ABSTRACT

A display panel and a display device are provided. The display panel includes: a display region and a non-display region surrounding the display region; multiple gate lines; and multiple data lines. The gate lines include regular gate lines and irregular gate lines. In the display region, the regular gate lines and the irregular gate lines are extended in a first direction, and a length of a part of the regular gate line in the display region is greater than a length of a part of the irregular gate line in the display region. The data lines include regular data lines and irregular data lines, and an extension direction of the regular data lines and the irregular data lines intersects with the first direction.

11 Claims, 9 Drawing Sheets

(56) References Cited

U.S. PATENT DOCUMENTS

| | | |
|---|---|---|
| 2018/0140377 A1 | 8/2018 | Xu et al. |
| 2019/0005915 A1* | 1/2019 | Liu .................. G02F 1/136286 |
| 2019/0121211 A1 | 4/2019 | Luo et al. |
| 2019/0197976 A1* | 6/2019 | Sasaki .................. G09G 3/3648 |

FOREIGN PATENT DOCUMENTS

| | | |
|---|---|---|
| CN | 107610636 A | 1/2018 |
| CN | 107634072 A | 1/2018 |
| KR | 20140078203 A | 6/2014 |
| KR | 20160090971 A | 8/2016 |

\* cited by examiner

US 10,845,660 B2

DISPLAY PANEL AND DISPLAY DEVICE

CROSS REFERENCE OF RELATED APPLICATION

The present application claims the priority to Chinese Patent Application No. CN201810090004.1, titled "DISPLAY PANEL AND DISPLAY DEVICE", filed on Jan. 30, 2018 with the Chinese Patent Office, which is incorporated herein by reference in its entirety.

FIELD

The present disclosure relates to the technical field of display, and particularly to a display panel and a display device.

BACKGROUND

With continuous development of the display technology, requirements on display function of a display device are increasingly higher today than a recent past. In addition, in order to better adapt to an overall structure and usage requirements of the display device, shape requirements are gradually increased. Thus an irregular-shaped display panel has occurred accordingly.

The display panel generally includes gate lines and data lines for providing signals for sub-pixels. In the irregular-shaped display panel, since a shape of the display panel is a non-rectangular shape, a wiring mode of the gate lines and the data lines is different from a wiring mode in a conventional display panel. Generally, wirings of the gate lines and the data lines are arranged accordingly so as to adapt to the shape of the display panel, resulting in that there may be the gate lines or the data lines of different lengths in a display region of the display panel. When the gate lines or the data lines of different lengths provide the signals for the sub-pixels, a difference between coupling voltages on the gate lines and the data lines results in a luminance difference between regions in the display panel. That is, display unevenness or even split screen display appears in the display panel, which affects the display effect of the display panel.

Hence, an urgent problem to be solved in the art is to provide a display panel and a display device, so as to eliminate the split screen display phenomenon of the display region and improve the display effect.

SUMMARY

In view of this, a display panel and a display device are provided in the present disclosure.

In a first aspect, in order to achieve the above technical effect, a display panel is provided in the present disclosure. The display panel includes: a display region, a non-display region surrounding the display region, multiple gate lines and multiple data lines. The multiple gate lines include multiple regular gate lines and multiple irregular gate lines. In the display region, the multiple regular gate lines and the multiple irregular gate lines are both extended in a first direction, and a length of each of the multiple regular gate lines in the display region is greater than a length of each of the irregular gate lines in the display region. The data lines include multiple regular data lines and multiple irregular data lines. An extension direction of the multiple regular data lines and the multiple irregular data lines intersects with the first direction.

In a second aspect, in order to achieve the above technical effect, a display device is provided in the present disclosure, which includes the display panel described above.

As the result, in the non-display region, at least one irregular data line intersects with the irregular gate lines in an insulating manner, and a coupling capacitance is generated between the irregular data lines and the irregular gate lines in the non-display region, such that the number of the coupling capacitances on the irregular data lines is increased, a difference between the numbers of the coupling capacitances on the irregular data lines and the regular data lines in the display region is compensated, the number of the coupling capacitances on the irregular gate lines is increased, and a difference between the numbers of the coupling capacitances on the irregular gate lines and the regular gate lines in the display region is also compensated, thereby eliminating the split screen phenomenon of the display region and improving the display effect of the display panel.

BRIEF DESCRIPTION OF THE DRAWINGS

Other features and advantages of the present disclosure will become clear through the detailed description of the exemplary embodiments of the present disclosure in conjunction with the drawings hereinafter.

The drawings, which are combined in the specification and form a part of the specification, show the embodiments of the present disclosure and are used for explaining the principle of the present disclosure together with the description of the drawings.

DETAILED DESCRIPTION

Figure 1:
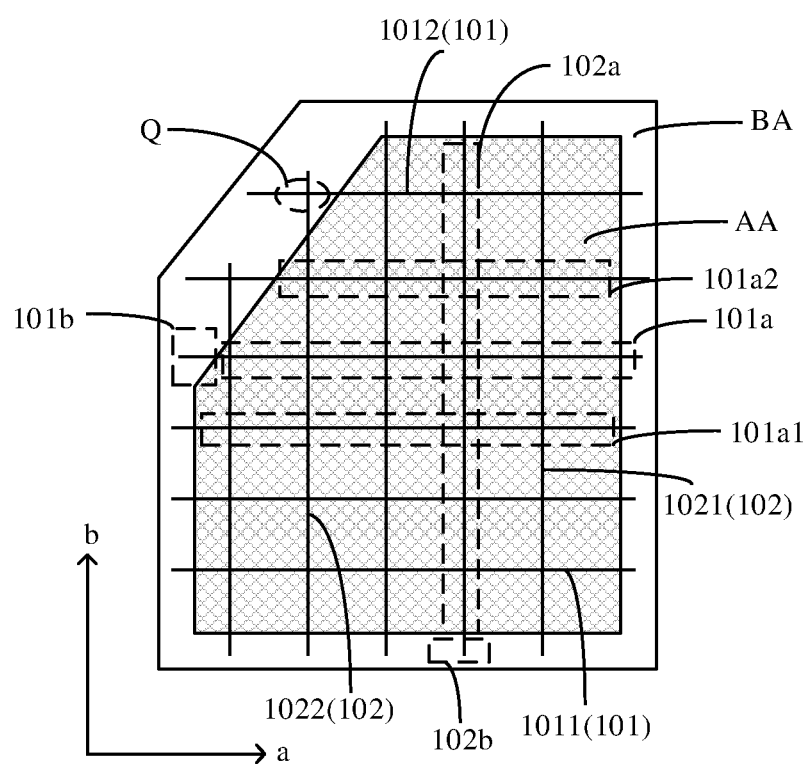
FIG. 1 is a schematic top view of a display panel according to an embodiment of the present disclosure.

Various exemplary embodiments of the present disclosure are described in detail with reference to the drawings. It should be noted that relative arrangement of components and steps, numerical expressions and values clarified in the embodiments are not intended to limit the scope of the present disclosure, unless otherwise specified.

The following description of the at least one exemplary embodiment is merely illustrative and shall not be construed as any limitation on the present disclosure and its application or use.

Techniques, methods and apparatus known to those skilled in the art may not be discussed in detail, but the techniques, methods and apparatus should be considered as a part of the specification where appropriate.

In all of the examples shown and discussed herein, any specific values are to be construed as illustrative only rather than limitation. Thus, different values may be used in other examples of the exemplary embodiments.

It should be noted that similar reference numerals and letters indicate similar items in the following drawings. Therefore, once an item is defined in one drawing, the item is unnecessary to be further discussed in subsequent drawings.

With diversification of a display device's shape and an increased demand for the use experience of a display device product from a user, irregular-shaped display panels have become popular. For example, a notch is arranged in an upper display region of the display panel, and devices such as an earpiece and a camera are integrated in the notch to increase a screen-to-body ratio. Alternatively, a corner of the display panel is designed to be a curved corner to improve a visual effect, or other non-rectangular shape smart wearable devices are provided. These special designs result in non-conventional rectangular shapes in the display region, and therefore sub-pixels, gate lines or data lines in the display panel are required to be adjusted in accordance with the shapes of the display region.

Wirings of the gate lines and the data lines in the display panel are arranged in different metal film layers. Generally, the extension direction of the gate lines and the extension direction of the data lines intersect each other. After a voltage is applied to the gate lines and the data lines, a coupling capacitance is generated at positions where the gate lines and the data lines intersect since the gate lines and the data lines are separated by a certain distance. It is found by the inventors that in the above irregular-shaped display panel, the gate lines of different lengths and the data lines of different lengths may be arranged in the display region for adapting the irregular-shaped display region. It is defined by the inventors that: gate lines with longer lengths in the display region are regular gate lines, gate lines with shorter lengths in the display region are irregular gate lines, data lines with longer lengths in the display region are regular data lines, and data lines with shorter lengths in the display region are irregular data lines. In the display region, the number of the gate lines that intersect with the regular data lines in an insulating manner is greater than the number of the gate lines that intersect with the irregular data lines in an insulating manner, resulting in the difference between a coupling capacitance generated between the gate lines and the regular data lines and a coupling capacitance generated between the gate lines and the irregular data lines. Hence, differences from signal charging occur between the regular data lines and the irregular data lines, and so luminance levels of the sub-pixels electrically connected to the regular data lines and the irregular data lines are different, resulting in vertical split screen of the display region. In the display region, the number of the data lines that intersect with the regular gate lines in an insulating manner is greater than the number of the data lines that intersect with the irregular gate lines in an insulating manner, resulting in a difference in the coupling capacitance generated between the data lines and the regular gate lines and also a difference in the coupling capacitance generated between the data lines and the irregular gate lines. Hence, gate voltage loading differences occur between the regular gate lines and the irregular gate lines, and luminance levels of the sub-pixels electrically connected to the regular gate lines and the irregular gate lines are different, resulting in horizontal split screen of the display region.

In order to eliminate the split screen of the display region, a display panel and a display device are provided in the present disclosure. The irregular gate lines and the irregular data lines are arranged to intersect each other in an insulating manner in the non-display region of the display panel, to reduce the difference between the coupling capacitances on the irregular gate lines and the regular gate lines, and/or the difference between the coupling capacitances on the irregular data lines and the regular data lines, so as to eliminate the split screen phenomenon of the display region and improve the display effect. A core concept of the present disclosure is described above. The core concept of the present disclosure is described in detail by embodiments hereinafter.

A display panel is provided in the present disclosure. A display region of the display panel has an irregular-shaped design. The display panel may be a display panel with a notch in the display region, a display panel that a corner of the display region is not a right angle, or a display panel with other irregular-shaped display region.

FIG. 1 is a schematic top view of a display panel according to an embodiment of the present disclosure. FIG. 1 shows an example of an optional irregular-shaped display panel. As shown in FIG. 1, the display panel includes a display region AA and a non-display region BA surrounding the display region AA. The display panel includes multiple gate lines 101, where the gate lines 101 include regular gate lines 1011 and irregular gate lines 1012. In the display region AA, the regular gate lines 1011 and the irregular gate lines 1012 are extended in a first direction a, and a length of a part 101a1 of the regular gate line 1011 in the display region is greater than a length of a part 101a2 of the irregular gate line 1012 in the display region. In a case where the display panel includes multiple irregular gate lines 1012, lengths of the portions 101a2 of the irregular gate lines 1012 in the display region may be the same or different. It should be noted that in the display panel, the non-display region BA is further provided with cascaded shift registers (not shown). The gate lines 101 are required to be extended to the non-display region BA, so as to be electrically connected to the shift registers, thereby achieving step-by-step scanning of the gate lines 101 in the display region. Hence, the gate line 101 includes the part 101a in the display region and the part 101b in the non-display region. The display panel includes multiple data lines 102, where the data lines 102 include regular data lines 1021 and irregular data lines 1022. An extension direction b of the regular data lines 1021 and the irregular data lines 1022 intersect with the first direction a. It should be noted that the data lines 102 in the display panel are required to be extended from the display region AA to the non-display region BA, so as to be connected to a drive chip (not shown), thereby providing data signals for the data lines 102 in the display region AA. Hence, the data line 102 may also include the part 102a in the display region and the part 102b in the non-display region. FIG. 1 only schematically shows a location of the part 102b of the data line 102 in the non-display region.

In the display region AA, the number of the gate lines 101 that intersect with the regular data lines 1021 in an insulating manner is greater than the number of the gate lines 101 that intersect with the irregular data lines 1022 in an insulating manner. In the non-display region BA, at least one irregular data line 1022 intersects with the irregular gate line 1012 in an insulating manner, as shown by a region Q in FIG. 1. It should be noted that the present disclosure includes multiple cases. For example, one irregular data line 1022 intersects with only one irregular gate line 1012 in an insulating manner, one irregular data line 1022 intersects with two or more irregular gate lines 1012 in an insulating manner, two or more irregular data lines 1022 intersect with one irregular gate line 1012 in an insulating manner, or two or more irregular data lines 1022 each intersect with multiple irregular gate lines 1012 in an insulating manner, and so on.

The display panel includes multiple sub-pixels. The gate lines provide gate scanning signals for the sub-pixels, and the data lines provide data signals for the sub-pixels. The display panel has a multi-film layer stacking structure. The display panel includes an array layer configured to arrange a thin film transistor for controlling a sub-pixel switch. The array layer includes a semiconductor active layer, a gate metal layer, a source drain metal layer and insulation layers arranged between the metal film layers, such as a gate insulation layer, an interlayer insulation film, a passivation layer and a planarization layer. In general, the gate lines are located in the gate metal layer, and the data lines are located in the source drain metal layer, which is not limited in the present disclosure.

In the display panel provided in the present disclosure, the gate lines 101 include the regular gate lines 1011 and the irregular gate lines 1012, and the length of the part 101a1 of the regular gate lines 1011 in the display region is greater than the length of the part 101a2 of the irregular gate line 1012 in the display region. The data lines 102 include the regular data lines 1021 and the irregular data lines 1022. As shown in FIG. 1, the display panel includes: five data lines 102 including three regular data lines 1021 and two irregular data lines 1022; and six gate lines 101 including four regular gate lines 1011 and two irregular data lines 1012. In the display region AA, the number of the gate lines 101 (six gate lines) that intersect with the regular data lines 1021 in an insulating manner is greater than the number of the gate lines 101 that intersect with the irregular data lines 1022 in an insulating manner. For the two irregular data lines 1022 shown in FIG. 1, in the display region AA, one irregular data line 1022 intersects with five gate lines 101 in an insulating manner, and the other irregular data line 1022 intersects with the four gate lines 101 in an insulating manner. Therefore, in the display region AA, the number of the coupling capacitances on the regular data lines 1021 is greater than the number of the coupling capacitances on the irregular data lines 1022. In the present disclosure, in the non-display region BA, at least one irregular data line 1022 is provided to intersect with the irregular gate lines 1012 in an insulating manner, and a coupling capacitance is generated between the at least one irregular data line 1022 and the irregular gate line 1012 in the non-display region BA, such that the number of the coupling capacitances on the irregular data lines is increased, the difference between the numbers of the coupling capacitances on the irregular data lines 1022 and the regular data lines 1021 in the display region AA is compensated, and the signal charging difference between the regular data lines 1021 and the irregular data lines 1022 is reduced, thereby eliminating left and right split screen phenomenon of the display region and improving the display effect of the display panel.

In the display region AA, the regular gate lines 1011 and the irregular gate lines 1012 are extended in the first direction a, the extension direction b of the regular data lines 1021 and the irregular data lines 1022 intersects with the first direction a in the display panel. Since the length of the part 101a1 of the regular gate lines 1011 in the display region is greater than the length of the part 101a2 of the irregular gate lines 1012 in the display region, in the display region AA, the number of the data lines 102 that intersect with the regular gate lines 1011 in an insulating manner is greater than the number of the data lines 102 that intersect with the irregular gate lines 1012 in an insulating manner. Therefore, in the display region AA, the number of the coupling capacitances on the regular gate lines 1011 is greater than the number of the coupling capacitances on the irregular gate lines 1012. In the present disclosure, in the non-display region BA, at least one irregular data line 1022 intersects with the irregular gate lines 1012 in an insulating manner, and it is indicated that in the non-display region BA, there are the irregular gate lines 1012 that intersect with the at least one irregular data line 1022 in an insulating manner. In the non-display region BA, the coupling capacitance can be generated when the irregular gate lines 1012 intersect with the irregular data lines 1022 in an insulating manner, thereby increasing the number of the coupling capacitances on the irregular data lines, compensating the difference between the numbers of the coupling capacitances on the irregular gate lines 1012 and the regular gate lines 1011 in the display region, reducing the gate voltage signal loading difference between the irregular gate line 1012 and the regular gate line 1011, and eliminating up and down split screen phenomenon of the display region.

In summary, with the display panel provided in the present disclosure, in the non-display region, the at least one irregular data line intersects with the irregular gate lines in the insulating manner. The coupling capacitance is generated between the irregular data lines and the irregular gate lines in the non-display region, such that the difference between the numbers of the coupling capacitances on the irregular data lines and the regular data lines in the display region is compensated, and the difference between the numbers of the coupling capacitances on the irregular gate lines and the regular gate lines in the display region is compensated, thereby eliminating the split screen phenomenon of the display region, and improving the overall display effect of the display panel.

Moreover, in some optional implementations, reference is made to FIG. 1 continuously. The extension direction of the regular data lines 1021 and the irregular data lines 1022 intersects with the extension direction of the gate lines 101 in the display panel, and the length of the part of the regular data lines 1021 in the display region is greater than the length of the part of the irregular data lines 1022 in the display region. In the display region, the number of the gate lines 101 that interest with the regular data lines 1021 in an insulating manner is greater than the number of the gate lines 101 that interest with the irregular data lines 1022 in an insulating manner. In the present disclosure, the irregular data lines are required to be extended to the non-display region, so as to be electrically connected to the drive chip and intersect with the irregular gate lines in an insulating manner, thereby increasing the coupling capacitance on the irregular data lines and the regular gate lines, compensating the difference between the coupling capacitances on the irregular data lines and the regular data lines in the display region, and compensating the difference between the coupling capacitances on the irregular gate lines and the regular gate lines in the display region.

Figure 2:
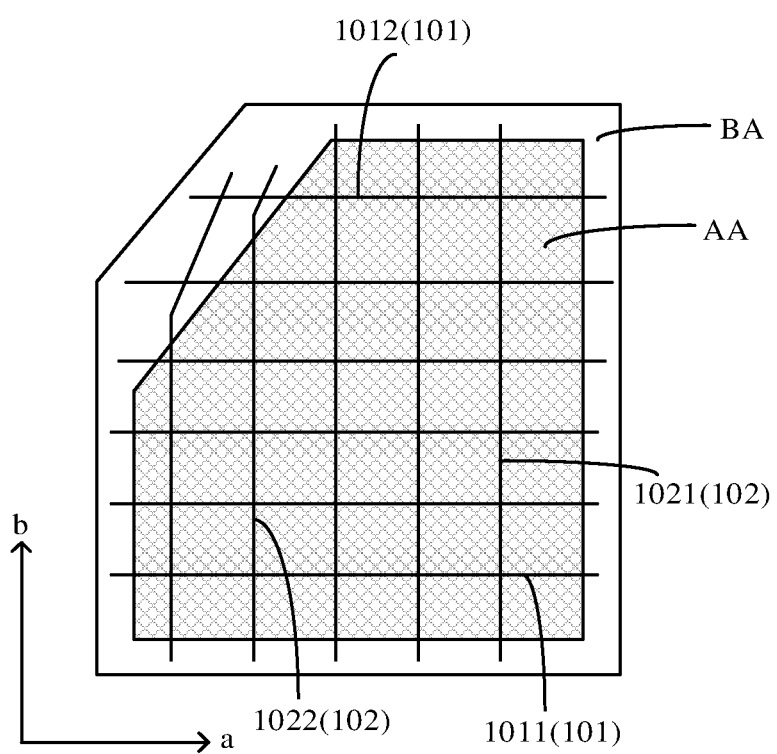
FIG. 2 is a schematic top view diagram of an optional implementation of a display panel according to the embodiment of the present disclosure in FIG. 1.

FIG. 2 is a schematic diagram of an optional implementation of a display panel according to an embodiment of the present disclosure. FIG. 2 shows an example of a display panel with the same shape as that in FIG. 1. As shown in FIG. 2, in the display region AA, the number of the gate lines 101 that intersect with the regular data lines 1021 in an insulating manner is greater than the number of the gate lines 101 that intersect with the irregular data lines 1022 in an insulating manner. All the irregular data lines 1022 intersect with all the irregular gate lines 1012 in an insulating manner in the display panel. The two irregular data lines 1022 in FIG. 2 each intersect with the two irregular gate lines 1012 in an insulating manner. Each of the irregular data lines intersects with all the irregular gate lines in an insulating manner to generate the coupling capacitance, thereby compensating the difference between the numbers of the coupling capacitances on the irregular data lines and the regular data lines in the display region, reducing the signal charging difference between the regular data lines and the irregular data lines, and eliminating left and right split screen phenomenon of the display region. Also, all the irregular data lines intersect with the irregular gate lines in an insulating manner. It is indicated that each of the irregular gate lines intersects with all the irregular data lines in an insulating manner to generate the coupling capacitance, thereby compensating the difference between the numbers of the coupling capacitances on the irregular gate lines and the regular gate lines in the display region, reducing the gate voltage loading difference between the regular gate lines and the irregular gate lines, and eliminating up and down split screen phenomenon of the display region. With the implementation, the display uniformity of the display panel is ensured and the display effect is improved.

Optionally, in a case that the irregular data lines 1022 intersect with the irregular gate lines 1012 in an insulating manner in the non-display region BA, the extension direction of the irregular data lines may be adjusted properly. As shown in FIG. 2, a wiring mode of the irregular data lines 1022 in the non-display region BA is beneficial to reduce an area of the non-display region occupied by the irregular data lines and the irregular gate lines, thereby meeting a narrow border requirement.

In some optional implementation, in the display region, one irregular data line intersects with N gate lines in an insulating manner, one irregular data line intersects with X gate lines in an insulating manner in the display region, and intersects with N-X irregular gate lines in an insulating manner in the non-display region. The gate lines that intersect with the regular data lines in an insulating manner in the display region include the regular gate lines or include the regular gate lines and the irregular gate lines, where both X and N are positive integers and X<N.

Figure 3:
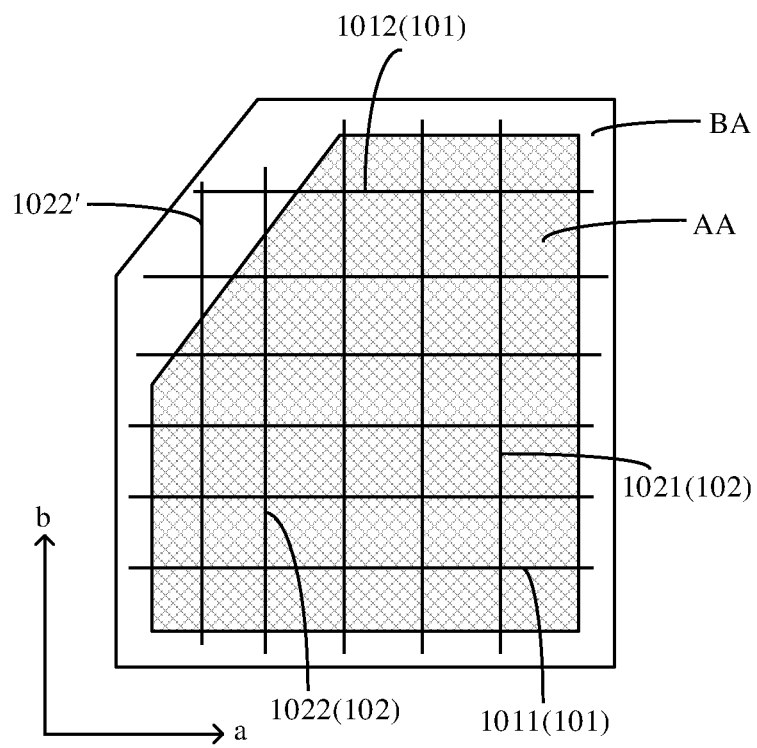
FIG. 3 is a schematic top view diagram of another optional implementation of a display panel according to the embodiment of the present disclosure in FIG. 1.

FIG. 3 is a schematic diagram of another optional implementation of a display panel according to an embodiment of the present disclosure. As shown in FIG. 3, the display panel includes three regular data lines 1021, two irregular data lines 1022, three regular gate lines 1011 and three irregular gate lines 1012. As shown in FIG. 3, in the display region, one regular data line 1021 intersects with six gate lines 101 (N=6) in an insulating manner. An irregular data line 1022' is taken as an example. The irregular data lines 1022' intersects with four gate lines (X=4) in an insulating manner in the display region AA, and intersects with two irregular gate lines 1012 (N-X=2) in an insulating manner in the non-display region BA. The regular data line 1021 intersects with six gate lines 101 in an insulating manner to generate the coupling capacitance, and the irregular data lines 1022' also intersects with six gate lines 101 (including four regular gate lines and two irregular gate lines) in an insulating manner to generate the coupling capacitance, such that the number of the coupling capacitances generated by the irregular data lines intersecting with the gate lines is equal to the number of the coupling capacitances generated by the regular data lines intersecting with the gate lines, thereby minimizing the difference between the luminance of the sub-pixels for which signals are respectively provided by the irregular data lines and the regular data lines caused by the difference between the numbers of the coupling capacitances generated by intersecting with the gate lines, and improving the display effect. Moreover, the irregular data lines intersect with the irregular gate lines in an insulating manner in the non-display region, and in this case the number of the coupling capacitances on the irregular gate lines can be increased in the non-display region, thereby compensating the difference between the number of the coupling capacitances generated by the irregular gate lines intersecting with the data lines in an insulating manner and the number of the coupling capacitances generated by the regular gate lines intersecting with the data lines in an insulating manner in the display region.

Figure 4:
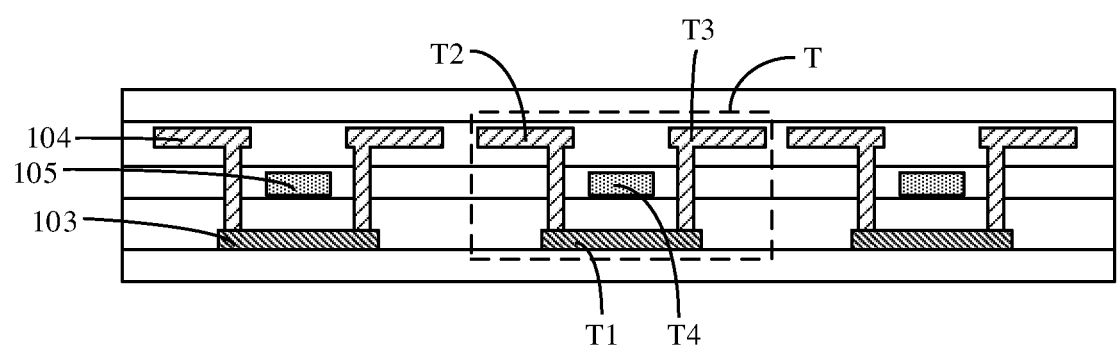
FIG. 4 is a cross-sectional view of a display panel film layers according to an embodiment of the present disclosure.

FIG. 4 is a schematic structural diagram of a display panel film layer according to an embodiment of the present disclosure. As shown in FIG. 4, the display panel includes a semiconductor active layer 103, a source drain metal layer 104 and a gate metal layer 105. The display panel includes multiple thin film transistors T, where the thin film transistor includes an active layer T1, a source T2, a drain T3 and a gate T4. In FIG. 4, the thin film transistor has a schematic top gate structure. The thin film transistor in the present disclosure may have a bottom gate structure, which is not repeated herein. In general, the active layer T1 is located in the semiconductor active layer 103, the source T2 and the drain T3 are located in the source drain metal layer 104, and the gate T4 is located in the gate metal layer 105. An insulation film layer is arranged between the metal film layers, such as a gate insulation layer and an interlayer insulation layer. A substrate layer may be arranged below the semiconductor active layer 103, and structures such as a passivation layer and a planarization layer may be further arranged above the source drain metal layer 104. In the present disclosure, the gate lines 101 are located in the gate metal layer 105, the parts of the regular data lines 1021 and the irregular data lines 1022 in the display region are located in the source drain metal layer 104. The part of the irregular data lines in the non-display region may be located in the source drain metal layer or the semiconductor active layer. That is, when the irregular data lines are extended to the non-display region, the wiring may be arranged in the same layer or different layers.

Figure 5:
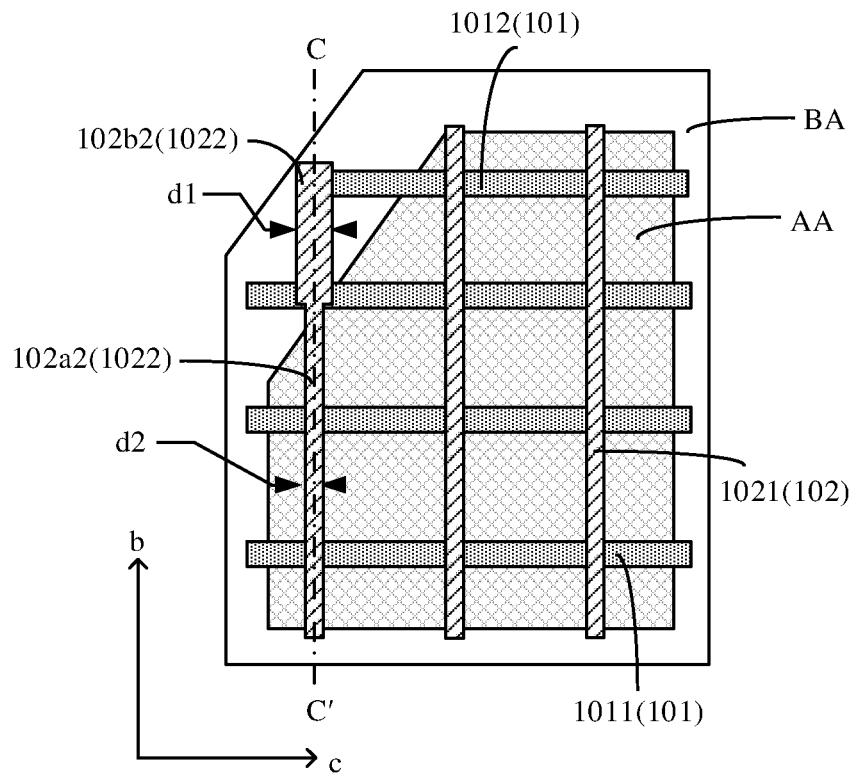
FIG. 5 is a top view of a schematic diagram of a display panel according to an embodiment of the present disclosure.
Figure 6:
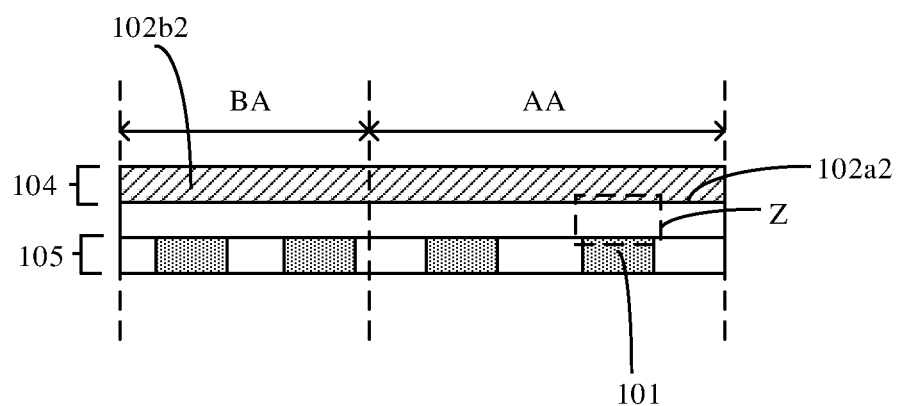
FIG. 6 shows a schematic cross-sectional diagram of FIG. 5 along a tangent line C-C'.

In an implementation, the parts of the irregular data lines in the non-display region are located in the source drain metal layer. Reference is made to FIG. 5 and FIG. 6, FIG. 5 is a schematic diagram of another optional implementation of a display panel according to an embodiment of the present disclosure, and FIG. 6 is a schematic cross-section diagram of FIG. 5 in a tangent line C-C'.

As shown in FIG. 5, in the non-display region BA, at least one irregular data line 1022 intersects with irregular gate lines 1012 in an insulating manner. An extension direction of the irregular data lines 1022 is b. In a direction c perpendicular to the extension direction of the irregular data lines 1022, a width d1 of a part 102b2 of at least one irregular data line 1022 in the non-display region is greater than a width d2 of a part 102*a*2 of the irregular data line 1022 in the display region. FIG. 6 is a schematic diagram of a film layer structure. As shown in FIG. 6, the gate lines 101 are located in the gate metal layer 105, the part 102*a*2 of the irregular data lines 1022 in the display region and the part 102*b*2 of the irregular data lines 1022 in the non-display region are located in the source drain metal layer 104. No matter in the display region AA or the non-display region BA, the coupling capacitance is generated in an overlapping region Z of the irregular data lines 102 and the gate lines 101. It should be noted that the display panel further includes other film layer structures, and only the gate metal layer 105 and the source drain metal layer 104 are shown in FIG. 6.

In the display panel, the data line is taken as the example. The coupling capacitance is not only generated by the data lines intersecting with the gate lines in an insulating manner, but also generated between the data lines and common electrodes or other wiring in the display panel, resulting in the coupling capacitance difference between the irregular data lines and the regular data lines. Similarly, the coupling capacitance is not only generated by the gate lines intersecting with the data lines in an insulating manner, but also generated between the gate lines and common electrodes or other wiring in the display panel, resulting in the coupling capacitance difference between the irregular gate lines and the regular gate lines. In the display panel provided in the implementation, the irregular data lines and the regular data lines are arranged in the drain source metal layer, and the width of the part of the irregular data line in the non-display region is set to be greater than the width of the part of the irregular data line in the display region. In this case, in the non-display region, in a case that the irregular data line is overlapped with the gate lines in the non-display region, an overlapping area of the part of the irregular data line in the non-display region is large since the width of the part of the irregular data line in the non-display is large. Therefore, a single capacitance generated by the part of the irregular data line in the non-display region intersecting with the gate lines in an insulating manner is greater than a single capacitance generated by the part of the irregular data line in the display region intersecting with the gate lines in an insulating manner. In the non-display region, the irregular data lines intersect with the irregular gate lines in an insulating manner, thereby compensating the difference between the numbers of the coupling capacitances on the irregular data line and the regular data lines in the display region AA. In addition, the single capacitance generated by the part of the irregular data line in the non-display region intersecting with the gate lines in an insulating manner is greater than the single capacitance generated by the part of the irregular data line in the display region intersecting with the gate lines in an insulating manner, and the coupling capacitance between the irregular data lines and other wirings as well as the coupling capacitance between the regular data lines and other wirings are further compensated. Similarly, in the implementation, the coupling capacitance between the regular gate lines and other wirings as well as the coupling capacitance between the irregular gate lines and other wirings are further compensated, thereby eliminating the split screen phenomenon of the display region and improving the display effect. Also, the irregular data lines and the regular data lines in the display panel are arranged in the source drain metal layer. A process is not required to be changed in a case of fabricating the display panel, and the process is relatively simple.

In another implementation, the parts of the irregular data lines in the non-display region are located in the semiconductor active layer. It should be noted that in a case that the wiring of the irregular data lines is arranged in difference layers, a via hole is required to be provided to ensure the electrical connection between the part of the irregular data line in the display region and the part of the irregular data line in the non-display region. In this case, the via hole may be arranged in the display region or the non-display region. In a case that the via hole is provided, parts of the irregular data lines are difficult to be defined clearly. Specifically, in a first case, the via hole is arranged in the display region, the part of the irregular data line in the non-display region is extended from the display region to the non-display region. That is, a part of the irregular data line is located in the display region. In a second case, the via hole is arranged in the non-display region, the part of the irregular data line in the display region is extended from the display region to the non-display region. That is, a part of the irregular data line is located in the non-display region. In a third case, the via hole may be arranged at a junction of the display region and the non-display region. The second case is shown in FIG. 8.

Figure 7:
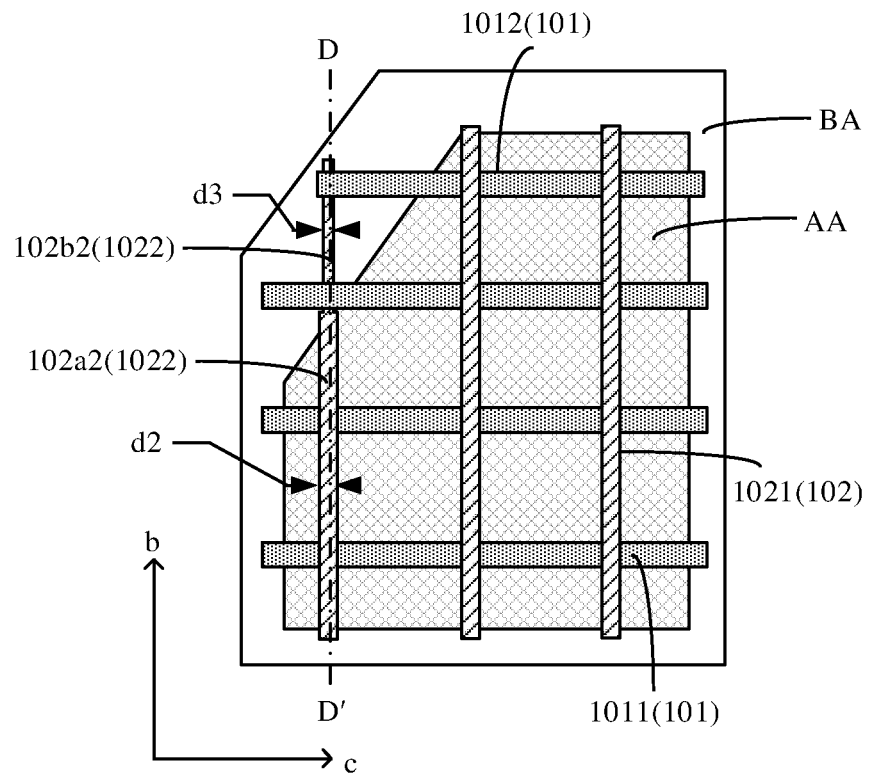
FIG. 7 is a schematic top view of a display panel according to another embodiment of the present disclosure.
Figure 8:
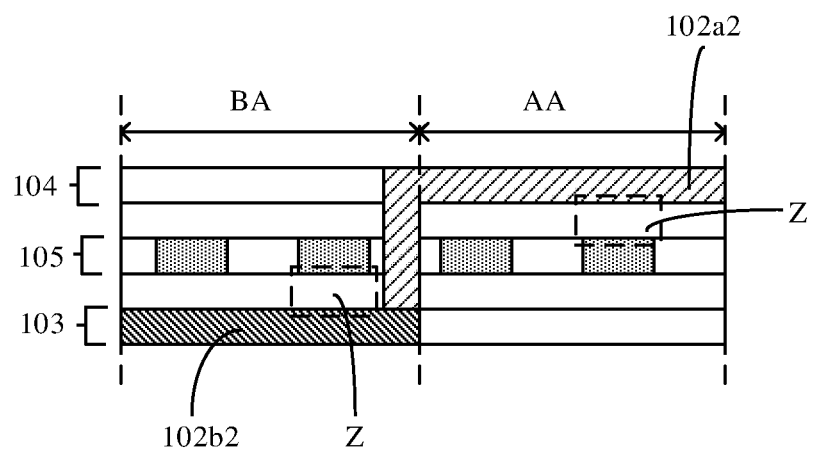
FIG. 8 shows a schematic cross-sectional diagram of FIG. 7 along a tangent line D-D'.

Reference is made to FIG. 7 and FIG. 8, FIG. 7 is a schematic diagram of another optional implementation of a display panel according to an embodiment of the present disclosure, and FIG. 8 is a schematic cross-section diagram of FIG. 7 in a tangent line D-D'.

As shown in FIG. 7, in the non-display region BA, at least one irregular data line 1022 intersects with the irregular gate lines 1012 in an insulating manner. An extension direction of the irregular data lines 1022 is b. In a direction c perpendicular to the extension direction of the irregular data lines 1022, a width d3 of the part 102*b*2 of at least one irregular data line 1022 in the non-display region is less than a width d2 of the part 102*a*2 of the irregular data line 1022 in the display region. FIG. 8 is a schematic diagram showing a film layer structure. As shown in FIG. 8, gate lines 101 are located in the gate metal layer 105, the parts 102*a*2 of the irregular data lines 1022 in the display region are located in the source drain metal layer 104, and the parts 102*b*2 of the irregular data lines 1022 in the non-display region are located in the semiconductor active layer 103. It should be noted that, the display panel further includes other film layer structures, and only the gate metal layer 105 and the semiconductor active layer 103 are shown in FIG. 8.

In the display panel provided in the implementation, the gate lines are located in the gate metal layer, the parts of the irregular data lines in the display region and the regular data lines are provided in the source drain metal layer, and the parts of the irregular data lines in the non-display region are provided in the semiconductor active layer. A thickness of an insulation layer medium arranged between the semiconductor active layer and the gate metal layer is greater than a thickness of an insulation layer medium arranged between the gate metal layer and the source drain metal layer in a regular display panel film layer structure. If the parts of the irregular data lines in the non-display region are provided in the semiconductor active layer, due to the large thickness of the insulation layer medium, a great coupling capacitance is generated by the parts of the irregular data lines in the non-display region intersecting with the gate lines in an insulating manner. In addition, a great capacitance may be generated by the irregular data lines intersecting with the irregular gate lines in an insulating manner in the non-display region, resulting in coupling capacitance compensation excess on the irregular data lines in the display region. Therefore, according to the implementation, the width of the part of the irregular data line in the non-display region is set be less than the width of the part of the irregular data line in the display region. An overlapping area of the parts of the irregular data lines in the non-display region and the gate lines is adjusted, so as to ensure that the capacitance generated by the parts of the irregular data lines in the non-display region intersecting with the gate lines in an insulating manner is not excessive, thereby ensuring that the irregular data lines intersect with the irregular gate lines in an insulating manner in the non-display region to compensate the difference between the numbers of the coupling capacitances on the irregular data line and the regular data lines in the display region AA. Similarly, in the implementation, the coupling capacitance difference between the irregular gate lines and the regular gate lines is compensated, thereby eliminating the split screen phenomenon of the display region and improving the display effect.

In some optional implementation, in the display panel according to the embodiment of the present disclosure, the display region has an irregular-shaped border. The non-display region includes an irregular-shaped non-display region adjacent to the irregular-shaped border. In the irregular-shaped non-display region, at least one irregular data line intersects with the irregular gate lines in an insulating manner. The irregular-shaped border of the display region includes multiple cases. For example, due to the irregular-shaped border of the display region, a notch is formed in the display region or a non-right angle corner is formed in the display region. The irregular-shaped border includes but is not limited to the above cases. Hereinafter the display panel with the irregular-shaped border in the display region is described by examples.

Figure 9:
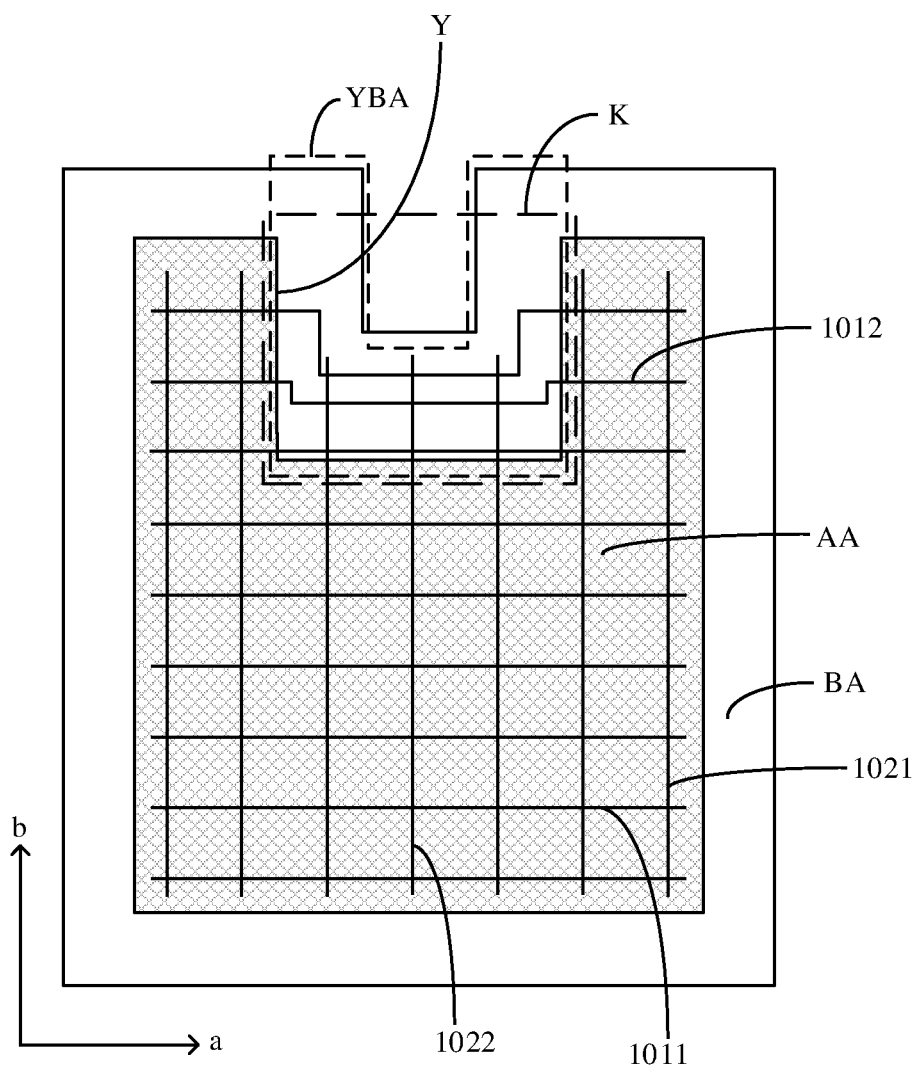
FIG. 9 is a schematic top view of a display panel according to yet another embodiment of the present disclosure.

In a case, FIG. 9 is a schematic diagram of another optional implementation of a display panel according to an embodiment of the present disclosure. As shown in FIG. 9, the display region AA includes an irregular-shaped border Y. A border of the display region AA is recessed into the display region AA to form the irregular-shaped border Y. Due to the irregular-shaped border Y, a notch K is formed in the display region AA. The non-display region BA includes an irregular-shaped non-display region YBA adjacent to the irregular-shaped border Y. In the display region AA, the regular gate lines 1011 and the irregular gate lines 1012 are extended in the first direction a. The extension direction b of the regular data lines 1021 and the irregular data lines 1022 intersects with the first direction a. In the irregular-shaped non-display region YBA, at least one irregular data line 1022 intersects with the irregular gate lines 1012 in an insulating manner.

In the display panel, the display region AA includes the notch K. In order to ensure that normal display can be achieved in the display regions AA located at both sides of the notch K, wiring is arranged in the irregular-shaped non-display region YBA to connect the gate lines located at the both sides of the notch K and located at the same row (the irregular gate lines defined in the present disclosure). That is, the irregular gate line 1012 includes the part 101a2 in the display region and the part 101b2 in the non-display region. In the related technology, the data lines terminate at a position of the notch K. In the present disclosure, the irregular data line 1022 does not terminate at the position of the notch K, and at least one irregular data line 1022 extends into the irregular-shaped non-display region YBA and intersects with the irregular gate lines 1012 in an insulating manner. FIG. 9 shows that all the irregular data lines 1022 in the display panel each intersect with all the irregular gate lines 1012 in an insulating manner in the irregular-shaped non-display region YBA.

In the implementation, the irregular data lines are arranged to intersect with the irregular gate lines in an insulating manner in the irregular-shaped non-display region. In the irregular-shaped non-display region, the coupling capacitance is generated between the irregular data lines and the irregular gate lines. In this case, the number of the coupling capacitances on the gate lines located at both sides of the notch and located at the same row (the irregular gate lines defined in the present disclosure) in the display panel can be increased to compensate the difference between the numbers of the coupling capacitances on the irregular gate lines located at both sides of the notch and located the same row and the regular gate lines, thereby eliminating up and down split screen of the display region. In addition, the number of the coupling capacitances on the irregular data lines in the display panel is increased, and the difference between the numbers of the coupling capacitances on the irregular data lines and the regular data lines is compensated, thereby eliminating left and right split screen of the display region. In the implementation, the overall display effect of the display panel is improved.

It should be noted that although a shape of the notch in the drawings of the present disclosure is a rectangle for example, the rectangle shape is only schematic and is not intended to limit the shape of the notch. Optionally, the shape of the notch includes but not limited to a rectangle, a trapezoid or a triangle, and the shape of the notch may be determined based on actual design requirements.

In another case, corners of the display region include a non-right angle corner, and the non-right angle corner is formed in the display region due to the irregular-shaped border. The non-right angle corner of the display region may include an angle C or an angle R, where the angle C and the angle R are defined according to relevant definitions in mechanical engineering. For the display panel, the angle C may be understood as a bevel angle, while the angle R may be understood as a rounded angle. Both cases are described in detail in the following embodiment.

Figure 10:
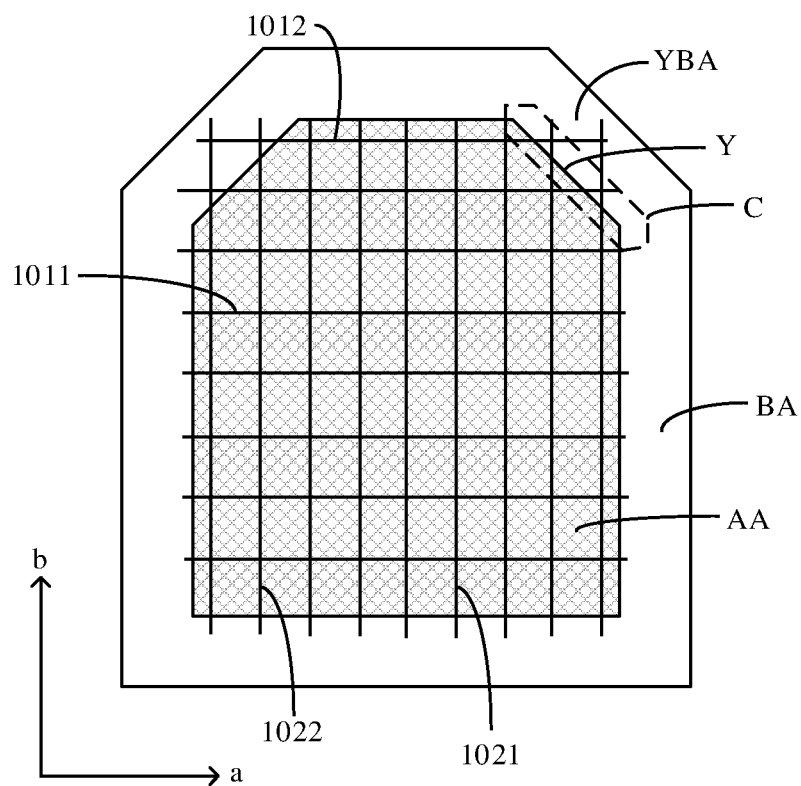
FIG. 10 is a schematic top view of a display panel according to yet another embodiment of the present disclosure.

FIG. 10 is a schematic diagram of another optional implementation of a display panel according to an embodiment of the present disclosure. As shown in FIG. 10, the corner of the display region AA includes the angle C. Due to the irregular-shaped border Y, the angle C is formed in the display region. The non-display region BA includes the irregular-shaped non-display region YBA adjacent to the irregular-shaped border Y. In the display region AA, the regular gate lines 1011 and the irregular gate lines 1012 are extended in the first direction a, and the extension direction b of the regular data lines 1021 and the irregular data lines 1022 intersects with the first direction a. In the irregular-shaped non-display region YBA, at least one irregular data line 1022 intersects with the irregular gate lines 1012 in an insulating manner. FIG. 10 shows that all the irregular data lines 1022 in the display panel each intersect with the irregular gate lines 1012 in an insulating manner in the irregular-shaped non-display region YBA. In FIG. 10, the display region includes two angles C at a left side and a right side, for example. The display panel may also include one angle C, the number of angles C is not limited. The display region AA of the display panel may include the notch K shown in FIG. 9 and the angle C shown in FIG. 10.

Figure 11:
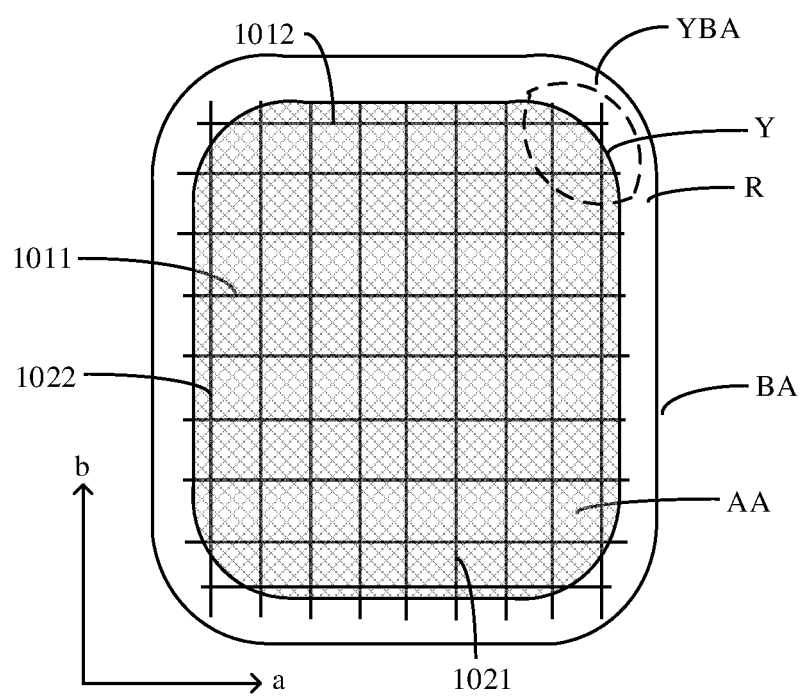
FIG. 11 is a schematic top view a display panel according to another embodiment of the present disclosure.

FIG. 11 is a schematic diagram of another optional implementation of a display panel according to an embodiment of the present disclosure. As shown in FIG. 11, the corner of the display region includes the angle R. Due to the irregular-shaped border Y, the angle R is formed in the display region. The non-display region BA includes an irregular-shaped non-display region YBA adjacent to the irregular-shaped border Y. In the display region AA, the regular gate lines 1011 and the irregular gate lines 1012 are extended in the first direction a, and the extension direction b of the regular data lines 1021 and the irregular data lines 1022 intersects with the first direction a. In the irregular-shaped non-display region YBA, at least one irregular data line 1022 intersects with the irregular gate lines 1012 in an insulating manner. FIG. 11 shows that all the irregular data lines 1022 in the display panel each intersect with the irregular gate lines 1012 in an insulating manner in the irregular-shaped non-display region YBA. In FIG. 11, the corners of the display region are angles R, for example. The display panel may also include one angle R, two angles R or three angles R. The display region AA of the display panel may also include the notch K shown in FIG. 9 and the angle R shown in FIG. 11.

In the above two implementations, the irregular data lines are arranged to intersect with the irregular gate lines in an insulating manner in the irregular-shaped non-display region. In the irregular-shaped non-display region, the coupling capacitance is generated between the irregular data lines and the irregular gate lines. In this case, the number of the coupling capacitances on the irregular gate lines in the display panel can be increased to compensate the difference between the numbers of the coupling capacitances on the irregular gate lines and the irregular gate lines, thereby eliminating the up and down split screen of the display region. In addition, the number of the coupling capacitances on the irregular data lines in the display panel can be increased to compensate the difference between the numbers of the coupling capacitances on the irregular data lines and the regular data lines, thereby eliminating left and right split screen of the display region. In the implementation, the overall display effect of the display panel is improved.

Figure 12:
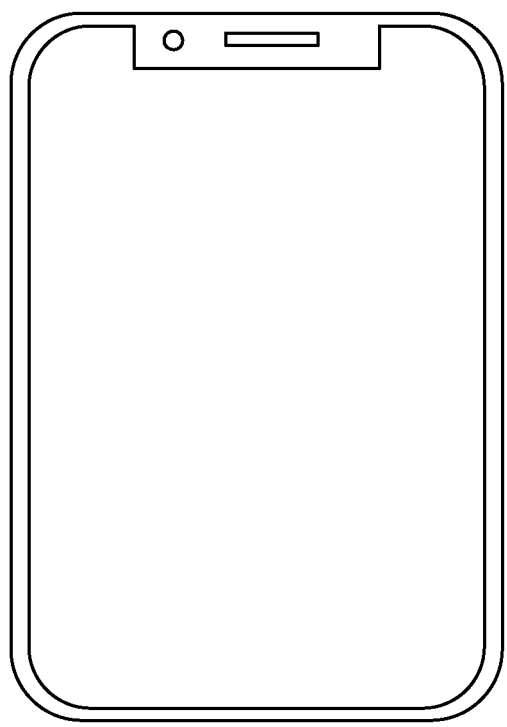
FIG. 12 is a schematic diagram of a display device according to the present disclosure.

A display device is further provided according to the present disclosure. FIG. 12 is a schematic diagram of a display device according to an embodiment of the present disclosure. The display device provided in the present disclosure includes the display panel provided according to any one of the embodiments of the present disclosure.

It may be known from the above embodiments that, the display panel and the display device of the present disclosure achieve the following beneficial effects.

In the non-display region, at least one irregular data line intersects with the irregular gate lines in an insulating manner. The coupling capacitance is generated between the irregular data line and the irregular gate lines in the non-display region, thereby increasing the number of the coupling capacitances on the irregular data lines to compensate the difference between the numbers of the coupling capacitances on the irregular data lines and the regular data lines in the display region. In addition, the number of the coupling capacitances on the irregular gate lines is also increased to compensate the difference between the numbers of the coupling capacitances on the irregular gate lines and the regular gate lines in the display region, thereby eliminating the split screen phenomenon of the display region and improving the overall display effect of the display panel.

Although some specific embodiments of the present disclosure are described by examples in detail, those skilled in the art should understand that the above examples are only schematic and are not intended to limit the scope of the present disclosure. Those skilled in the art should understand that the above embodiments may be modified without deviating from the scope and spirit of the present disclosure. The scope of the disclosure is defined by the attached claims.

What is claimed is:

1. A display panel, comprising:
   a display region;
   a non-display region surrounding the display region;
   a plurality of gate lines, wherein the plurality of gate lines comprises a plurality of regular gate lines and a plurality of irregular gate lines; in the display region, the plurality of regular gate lines and the plurality of irregular gate lines are both extended in a first direction, and a length of each of the plurality of regular gate lines in the display region is greater than a length of each of the irregular gate lines in the display region; and
   a plurality of data lines, wherein the data lines comprise a plurality of regular data lines and a plurality of irregular data lines, an extension direction of the plurality of regular data lines and the plurality of irregular data lines intersects with the first direction,
   wherein in the display region, the number of the plurality of gate lines that intersect with the plurality of regular data lines in an insulating manner is greater than the number of the plurality of gate lines that intersect with the irregular data lines in an insulating manner; and in the non-display region, at least one of the plurality of irregular data lines intersects with the plurality of irregular gate lines in an insulating manner; and
   wherein each of the plurality of irregular data lines and each of the plurality of irregular gate lines intersect in an insulating manner.

2. The display panel according to claim 1, wherein a length of one of the plurality of regular data lines in the display region is greater than a length of one of the plurality of irregular data lines in the display region.

3. The display panel according to claim 1, wherein
   in the display region, one of the plurality of regular data lines intersects with a number of the plurality of gate lines in an insulating manner, wherein the number is N; and
   one of the plurality of irregular data lines intersects with another number of the plurality of gate lines in an insulating manner in the display region, wherein the another number is X, and intersects with N less X (N–X) of the plurality of irregular gate lines in an insulating manner in the non-display region, wherein both X and N are positive integers and X<N.

4. The display panel according to claim 1, further comprising a semiconductor active layer, a source drain metal layer, and a gate metal layer, wherein
   the plurality of gate lines are located in the gate metal layer, and a subset of the plurality of regular data lines and a subset of the plurality of irregular data lines in the display region are located in the source drain metal layer.

5. The display panel according to claim 4,
   wherein a subset of the plurality of irregular data lines in the non-display region are located in the source drain metal layer; and
   wherein a width of at least one of the plurality of irregular data lines in the non-display region is greater than a width of the at least one of the plurality of irregular data lines in the display region, in a direction perpendicular to the extension direction of the plurality of irregular data lines.

6. The display panel according to claim 4, wherein
a subset of the plurality of irregular data lines in the non-display region are located in the semiconductor active layer; and
a width of at least one of the plurality of irregular data lines in the non-display region is less than a width of the at least one of the plurality of irregular data lines in the display region, in a direction perpendicular to the extension direction of the plurality of irregular data lines.

7. The display panel according to claim 1,
wherein the display region has an irregular-shaped border, wherein the non-display region comprises an irregular-shaped non-display region adjacent to the irregular-shaped border of the display region; and
wherein in the irregular-shaped non-display region, at least one of the plurality of irregular data lines intersects with one of the plurality of irregular gate lines in an insulating manner.

8. The display panel according to claim 7, wherein a border of the display region is recessed into the display region to form a notch in the irregular-shaped border.

9. The display panel according to claim 8, wherein the notch is a rectangular, a trapezoidal or a triangular.

10. The display panel according to claim 7, wherein a corner of the display region comprises a non-right angle corner as an irregular-shaped border.

11. A display device, comprising a display panel, wherein the display panel comprises:
a display region;
a non-display region surrounding the display region;
a plurality of gate lines, wherein the gate lines comprise a plurality of regular gate lines and a plurality of irregular gate lines; in the display region, the plurality of regular gate lines and the plurality of irregular gate lines are extended in a first direction, and a length of one of the plurality of regular gate lines in the display region is greater than a length of one of the plurality of irregular gate lines in the display region; and
a plurality of data lines, wherein the plurality of data lines comprise a plurality of regular data lines and a plurality of irregular data lines, an extension direction of the plurality of regular data line and the plurality of irregular data line intersects with the first direction,
wherein in the display region, the number of the plurality of gate lines that intersect with the plurality of regular data lines in an insulating manner is greater than the number of the plurality of gate lines that intersects with the plurality of irregular data lines in an insulating manner; and in the non-display region, at least one of the plurality of irregular data lines intersects with one of the plurality of irregular gate lines in an insulating manner; and
wherein each of the plurality of irregular data lines and each of the plurality of irregular gate lines intersect in an insulating manner.

* * * * *